United States Patent

Baptista et al.

[15] 3,699,135

[45] Oct. 17, 1972

[54] ORGANOSILICON POLYMERIC DYES

[72] Inventors: John L. Baptista; Frederick J. Rauner; John A. Ford, Jr., all of Rochester, N.Y.

[73] Assignee: Eastman Kodak Company, Rochester, N.Y.

[22] Filed: Aug. 18, 1969

[21] Appl. No.: 851,046

[52] U.S. Cl. ..............260/37 SB, 8/DIG. 1, 8/DIG. 7
[51] Int. Cl. ..............................................C08g 51/04
[58] Field of Search ...260/37 SB; 8/DIG. 1; 8/DIG. 7

[56] References Cited

UNITED STATES PATENTS

| | | | |
|---|---|---|---|
| 2,727,045 | 12/1955 | McSheehy | 260/379 |
| 2,131,712 | 9/1938 | Schaeller et al. | 260/86 |
| 3,025,179 | 3/1962 | Halhein | 260/37 SB |
| 2,732,382 | 1/1956 | Minsk et al. | 260/379 |
| 2,925,313 | 2/1960 | Bailey et al. | 8/DIG. 1 X |

FOREIGN PATENTS OR APPLICATIONS

| | | | |
|---|---|---|---|
| 882,068 | 11/1961 | Great Britain | 8/DIG. 7 |

OTHER PUBLICATIONS

American Chemical Society, Chemical Abstracts, paragraphs: 67:3690u (1967).
American Chemical Society, Chemical Abstracts, paragraphs: 57:7419i (1957).
American Chemical Society, Chemical Abstracts, paragraphs: 68:60525p (1968).
Chemical Abstracts, par. 68:60525p (1968).

*Primary Examiner*—Morris Liebman
*Assistant Examiner*—S. M. Person
*Attorney*—William H. J. Kline, James R. Frederick and Joshua G. Levitt

[57] ABSTRACT

Polymeric dyes prepared by the copolymerization of a diorganodifunctionalsilane with a derivative of anthraquinone containing two aliphatic hydroxy groups. The polymeric dyes are useful as coloring material in photoresist formulations and for other purposes.

7 Claims, No Drawings

ORGANOSILICON POLYMERIC DYES

This invention relates to polymeric dyes and, in particular, to polymeric dyes prepared by the copolymerization of a diorganodifunctionalsilane with a derivative of anthraquinone containing two aliphatic hydroxy groups.

The general type reaction of the condensation of a diorganodifunctionalsilane with an aliphatic or aromatic diol is known, for example, from the Journal of Applied Polymer Science, Vol. 9, pp. 295–311 (1965). The main interest of this earlier work was to develop high molecular weight, thermally stable polymers for use as coatings, plastics, adhesives, elastomers, etc. However, this general type condensation reaction has not been used to make polymeric dyes, nor have such dyes been described or used.

In order to be better able to observe the formation of photographic images, for example, photoresist images, during and after development, it is expedient to incorporate coloring material into the photosensitive formulations. This procedure is particularly useful in positive-working systems where an image is developed in exposed areas.

It is an object of the invention to provide novel organosilicon polymeric dyes.

It is a further object of the invention to provide novel organosilicon polymer dyes prepared by the copolymerization of a diorganodifunctionalsilane with a derivative of anthraquinone containing two aliphatic hydroxy groups.

It is yet a further object of the invention to provide such polymeric dyes having a molecular weight of 1,500 to 25,000 and which are soluble in organic solvents.

It is still a further object of the invention to provide such polymeric dyes which are film formers and which have little or no solubility in basic aqueous solutions.

It is another object to provide photoresist compositions of good color containing such polymeric dyes.

The foregoing and other objects of this invention are achieved by providing a dye copolymer of a diorganodifunctionalsilane and an anthraquinone derivative having two aliphatic hydroxy groups; the copolymer having repeating units of the formula:

(I) 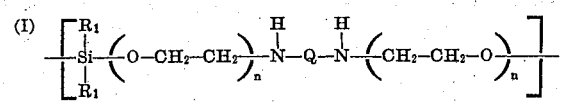

wherein $n$ is an integer of 1 to 4; $R_1$ is a lower alkyl, a lower cycloalkyl, a lower alkenyl or a lower aryl group; and Q is a divalent anthraquinonylene radical having the formula:

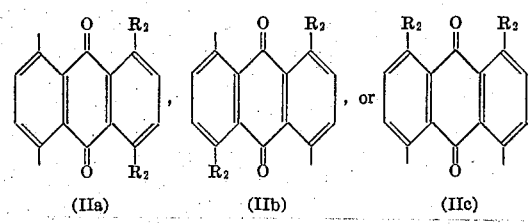

wherein $R_2$ is hydrogen, hydroxy or halogen; the copolymer having a molecular weight of from 1,500 to 25,000. The polymeric dyes of this invention are conveniently prepared by reacting a diorganodifunctionalsilane having the formula:

(III) 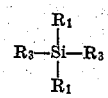

with a derivative of anthraquinone having the formula:

(IVa) 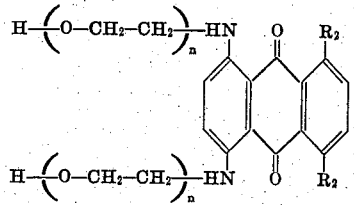

(IVb) 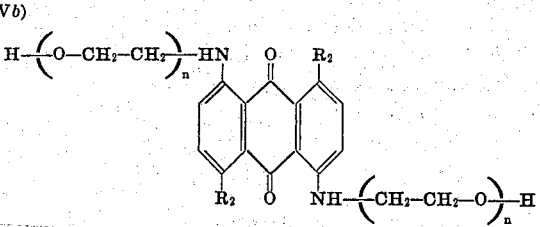

or (IVc) 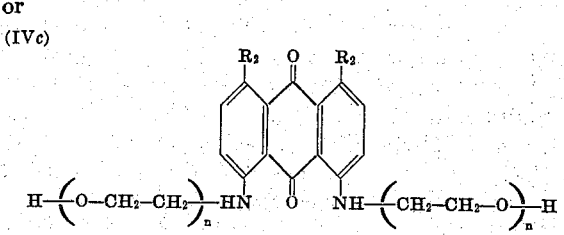

wherein $R_1$, $R_2$, and $n$ are the same as above and $R_3$ is a hydrolyzable or condensation displaceable functional group which, under the reaction conditions, will readily separate from the silane and will combine with the hydrogen atom of an aliphatic hydroxy radical, for example, $R_3$ is a halogen, an anilino, an alkoxy, an alkylamino, or the like groups.

The diorganodifunctionalsilane which is useful to produce polymers according to the invention includes two non-functional groups, $R_1$, which are not capable of reacting with the anthraquinone derivatives. These $R_1$ groups may be the same or different and are preferably lower alkyl, lower cycloalkyl, or lower aryl, or lower alkenyl, either unsubstituted or substituted with non-interfering groups. The term lower alkyl means straight or branched chain alkyl groups of up to seven carbon atoms such as methyl, ethyl, propyl, isopropyl, n-butyl, n-pentyl and the like, as well as aryl substituted alkyl such as benzyl and the like. The term lower cycloalkyl means groups of four to 10 carbon atoms including cyclobutyl, cyclohexyl and the like and includes alkyl substituted cycloalkyl. The term lower aryl means phenyl or substituted phenyl of up to 10 carbon atoms such as tolyl and the like. The term lower alkenyl means groups such as vinyl, allyl, and the like from two to seven carbon atoms. As mentioned above, these groups can be substituted with a non-interfering substituent, that is, a substituent which will not interfere with the polymerization reaction, such as hydroxy, alkoxy, and the like.

The silane also includes two functional groups, $R_3$, which enter into he polymerization reaction with the hydroxy groups of the anthraquinone derivative and which can be the same or different. Suitable functional groups are those which are hydrolyzable or condensation displaceable and hence can react with the hydroxy group of the anthraquinone compound, and include halogen, alkylamino, cycloalkylamino, arylamino, alkoxy and the like groups including such groups substituted with non-interfering substituents. Preferably $R_3$ is a halogen, an anilino, an alkyl-anilino of seven to 10 carbon atoms, an alkylamino of one to seven carbon atoms, or a cycloalkylamino of four to 10 carbon atoms. Suitable silanes include diphenyldiethoxysilane, diphenyldichlorosilane, dimethyldianilinosilane, diethyldianilinosilane, di-(p-chlorophenyl)dichlorosilane, dibenzyldichlorosilane, methylphenyldianilinosilane, and di-n-propyldichlorosilane.

The anthraquinones include two monovalent functional hydrogen terminated ethyleneoxyamino groups having the formula H$+$O$-$CH$_2$$-$CH$_2$$+_n$NH$-$ wherein $n$ is an integer of 1 to 4, preferably 1 to 2. The anthraquinones can also include one or two substituents, $R_2$, which can be the same or different and which will not condense with the silane, such as a hydroxy, a halogen, a nitro, an alkyl, an aryl, a cycloalkyl and the like groups, such as defined above for $R_1$. Suitable derivatives of anthraquinone include 1,4-bis(2-hydroxyethylamino)anthraquinone, 1,4-bis[2-(2-hydroxyethoxy)ethylamino]anthraquinone, 1,5-bis(2-hydroxyethylamino)anthraquinone, 1,5-bis[2-(2-hydroxyethoxy) ethylamino]-anthraquinone, 1,8-bis(2-hydroxyethylamino)anthraquinone, and 1,4-bis(2-hydroxyethylamino)-5,8-dihydroxyanthraquinone.

Copolymers according to the invention are produced by reacting substantially equimolar amounts of the silane and anthraquinone derivative. The reaction is preferably performed by a melt polymerization technique such as is described in the Journal of Applied Polymer Science, Vol. 9, pp. 295-311 (1965). The reaction flask is heated to a temperature of 150°-300° C., and vacuum to about 20 mm or less, preferably 1.0 mm or less, is applied with stirring while the temperature is maintained and the reaction continued until polymerization is complete. The reaction is usually complete in less than 1 hour and a reaction time of not more than 6 hours is sufficient. Provision is made for the removal of the volatile by-product $R_3$H which boils off under the temperature and pressure conditions present in the reaction vessel.

The polymer produced has a molecular weight of 1,500 to 25,000 and has a plurality of repeating units having formula I. Generally, the polymer will comprise from 4 to 50 of these repeating units and will be terminated by the groups present on the reactants, namely hydroxy in the case of the anthraquinone derivative and $R_3$ in the case of the silane.

The polymeric dyes of this invention are useful in a variety of applications for which dyes are conventionally employed. A particularly preferred use for these polymeric dyes is to impart color to photoresist compositions and in particular, positive-working photoresist compositions, so as to improve observation of the developed photoresist image. These dyes are particularly attractive for use in such compositions since they are soluble in the organic solvents normally used in coating such compositions, but are fast to alkali, which may be used in development of the resist image or etching of the substrate on which the photoresist composition is coated.

These polymeric dyes can be incorporated in a variety of photoresist compositions. Typical of such compositions are those based on such light-sensitive resin materials as cinnamic acid esters of hydroxy polymers such as are described in Minsk et al. U.S. Pat. No. 2,690,966, Minsk U.S. Pat. No. 2,725,372, Robertson et al. U.S. Pat. No. 2,732,301 and Sorkin U.S. Pat. No. 3,387,976; cinnamylidene malonate polyesters such as are described in Michiels et al. U.S. Pat. No. 2,956,878, and Clement et al. U.S. Pat. No. 3,173,787; azide sensitized rubber compositions such as are described in Hepher et al. U.S. Pat. No. 2,852,379 and Sagura et al. U.S. Pat. No. 2,940,853; polymeric quinone diazides such as are described in Rauner et al. U.S. Pat. Application Ser. No. 684,636, filed Nov. 21, 1967, and the like.

The amount of polymeric organosilicon dye incorporated in the photoresist composition can vary depending upon the particular photoresist composition employed, the depth of color desired, and the like criteria. In general, the dye can be employed in amount of about from 1 to 10 percent based on the weight of solids in the resist composition.

In addition to the light-sensitive component and the polymeric organosilicon dye, the resist composition will contain a coating solvent and can contain such addenda as additional non-light-sensitive polymers to modify the physical properties of the resist, sensitizers, surfactants, coating aids, and other addenda conventionally employed by, and known to those skilled in the art. The resist composition is coated on conventional substrates, such as metals, glass, polymeric materials, and the like, by such techniques as whirl coating, dip coating, etc.

The following examples are included for a further understanding of the invention.

EXAMPLE 1

1,5-Bis[2-(2-hydroxyethoxy)ethylamino]anthraquinone (14.2 g, 0.0343 mole) and diphenyldianilinosilane (12.6 g, 0.0343 mole) are placed in a 500-ml three-necked flask equipped with a nitrogen inlet, a mechanical stirrer, a vacuum source, and an outlet to a collection flask for the aniline by-product. The system is flushed with nitrogen, and a vacuum applied gradually. The reaction flask is heated to 165° C. A final vacuum of 0.5–1.0 mm of Hg, heating at 165° C., and stirring are maintained for 1 hour. The polymer's number-average molecular weight is 8,200 ± 25 percent. A film cast from chloroform appears red in color.

The polymer of this example conforms to structure I wherein $n$ is 2, $R_1$ is phenyl, Q is as shown in structure IIb, and $R_2$ is hydrogen. Similar results are obtained when the diphenyldianilinosilane is replaced by an equimolar amount of one of various other diorganodianilinosilanes described by structure III, and when the derivative of anthraquinone is replaced by an equimolar amount of the derivative of anthraquinone where $n=3$ or 4.

EXAMPLE 2

1,4-Bis[2-(2-hydroxyethoxy)ethylamino]anthraquinone (3.26 g, 0.00789 mole) and diphenyldianilinosilane (2.88 g, 0.00789 mole) are placed in a 500-ml three-necked flask equipped with a nitrogen inlet, mechanical stirrer, a vacuum source, and an outlet to a collection flask for the aniline by-product. The system is flushed with nitrogen, and a vacuum is applied gradually. The reaction flask is heated to 255° C. A final vacuum of 0.5–1.0 mm of Hg, heating at 255°C. and stirring are maintained for 5½ hours. The polymer's number-average molecular weight is 7200 ± 25 percent. A film cast from chloroform appears blue in color. This polymer conforms to structure I wherein $n$ is 2, $R_1$ is phenyl, Q is as shown by structure IIa, and $R_2$ is hydrogen. Similar results are obtained when the diphenyldianilinosilane is replaced by an equimolar amount of one of various other diorganodianilinosilanes as described by structure III, and when the derivative of anthraquinone is replaced by an equimolar amount of the derivative of anthraquinone where $n=3$ or 4.

EXAMPLE 3

1,4-Bis(2-hydroxyethylamino)anthraquinone (7.80 g, 0.0329 mole) and diphenyldianilinosilane (8.75 g, 0.0329 mole) are placed in a 500-ml three-necked flask equipped with a nitrogen inlet, mechanical stirrer, a vacuum source, and an outlet to a collection flask for the aniline by-product. The system is flushed with nitrogen, and a vacuum is applied gradually. The reaction flask is heated to 200° C. A final vacuum of 0.5–1.0 mm of Hg, heating at 200° C., and stirring are maintained for 4 hours. The polymer's number-average molecular weight is 2,000 ± 25 percent. A film cast from chloroform appears blue in color. This polymer conforms to structure I wherein $n$ is 1, $R_1$ is phenyl, Q is as shown by structure IIa, and $R_2$ is hydrogen. Similar results are obtained using various other diorganodianilinosilanes, for example, dimethyldianilinosilane.

EXAMPLE 4

1,4-Bis[2-(2-hydroxyethoxy)ethylamino]anthraquinone (34.5 g, 0.0835 mole) and diphenyldichlorosilane (21.1 g, 0.0835 mole) are placed in a 500-ml three-necked flask equipped with a nitrogen inlet, a mechanical stirrer, a vacuum source, and an outlet to a collection flask. The system is evacuated with a water aspirator, and the reaction flask is gradually heated to 175° C. over the period of an hour. The vacuum source is switched to a vacuum pump (0.5–1.0 mm of Hg), and the reaction flask is heated at 175° C. for an additional hour. Stirring is maintained throughout the entire preparation. The polymer's number-average molecular weight is 3,000 ± 25 percent. A film cast from chloroform appears blue in color. The polymer conforms to structure I wherein $n$ is 2, $R_1$ is phenyl, Q is as shown in structure IIa, and $R_2$ is hydrogen. Similar results are obtained when diphenyldichlorosilane is replaced by an equimolar amount of one of various other diorganodichlorosilanes as described by structure III, and when the derivative of anthraquinone is replaced by an equimolar amount of the 1,4 or 1,5 or 1,8 derivative of anthraquinone where $n=1, 2, 3,$ or 4.

EXAMPLE 5

1,4-Bis(2-hydroxyethylamino)-5,8-dihydroxyanthraquinone (12.0 g, 0.0335 mole) and diphenyldichlorosilane (7.65 g, 0.0302 mole) are placed in a 500-ml three-necked flask equipped with a nitrogen inlet, a mechanical stirrer, a vacuum source, and an outlet to a collection flask. The system is evacuated with a water aspirator, and the reaction flask is gradually heated to 180° C. over the period of an hour. The vacuum source is switched to a vacuum pump (0.5–1.0 mm of Hg), and the reaction flask is heated at 180° C. for an additional hour. Stirring is maintained throughout the entire preparation. The polymer's number-average molecular weight is estimated to be 2,000–3,000. A film cast from chloroform appears blue in color. This polymer conforms to structure I wherein $n$ is 1, $R_1$ is phenyl, Q is as shown in structure IIa, and $R_2$ is hydroxy. Similar results are obtained when the diphenyldichlorosilane is replaced by an equimolar amount of one of various other diorganodichlorosilanes as described by structure III, and when the derivative of anthraquinone is replaced by an equimolar amount of the 1,4 or 1,5 or 1,8 derivative of anthraquinone where $n=1, 2, 3,$ or 4.

EXAMPLE 6

1,4-Bis[2-(2-hydroxyethoxy)ethylamino]anthraquinone (19.9 g, 0.0482 mole) and diphenyldiethoxysilane (13.1 g, 0.0482 mole) are placed in a 500-ml three-necked flask equipped with a nitrogen inlet, a mechanical stirrer, a vacuum source, and an outlet to a collection flask. The reaction mixture is put under a nitrogen atmosphere, and the reaction flask is gradually heated to 240° C. over the period of 1 hour. The system is evacuated with a water aspirator for 1 hour during which time the reaction flask is kept at 240° C. At the end of this period, the vacuum source is switched to a vacuum pump (0.5–1.0 mm of Hg.), and the evacuation by vacuum pump and heating at 240° C. are maintained for ½ hour. Stirring is maintained throughout the entire preparations. The polymer's number-average molecular weight is 2,000 ± 25 percent. A film cast from chloroform appears blue in color. The polymer conforms to structure I wherein $n$ is 2, $R_1$ is phenyl, Q is as shown in structure IIa, and $R_2$ is hydrogen. Similar results are obtained when diphenyldiethoxysilane is replaced by an equimolar amount of one of the other diorganodiethoxysilanes as described by structure III, and when the derivative of anthraquinone is replaced by an equimolar amount of the 1,4 or 1,5 or 1,8 derivative of anthraquinone, where $n=1, 2, 3,$ or 4.

As mentioned above, the polymeric dyes according to the invention are useful in photoresist systems in order to be better able to observe the formation of the resist images. The invention provides organic solvent soluble polymeric dyes which, when used in a photoresist system, such as a positive-working system based on o-quinonediazides, impart red, green or blue color depending on the structure of the anthraquinone used. Those polymers wherein $n$ is 1 or 2, R is hydrogen or hydroxy, and Q is as represented by structure IIa, are preferred for use in the photoresist systems of this invention.

EXAMPLE 7

A positive-working resist formulation containing the polymeric dye of Example 3 is prepared as follows:

A. A light-sensitive coating formulation is prepared containing the following materials:

33.0 g of a copolymer of p-aminostyrene-styrene sulfonamide of naphthoquinone-(1,2)-diazide-(2)-5-sulfochloride (Prepared as described in Example 5 of Rauner et al. U.S. Pat. Application Ser. No. 684,636, filed Nov. 21, 1967.)
240.0 g cresol-formaldehyde resin
930 g methyl cellosolve acetate
70 g 4-butyrolactone
8.0 g of the condensation product of 1,4-bis(2-hydroxyethylamino)anthraquinone and diphenyldianilinosilane of Example 3.

B. A sheet of copper is cleaned by scrubbing with fine pumice and water, rinsed with distilled water, and the excess water removed with an air jet. The plate is dried for 5 minutes at 45° C.
The coating formulation is whirl coated at 80 rpm for ½ hour onto the copper plate and the element is prebaked at 75° C. for 30 minutes. The plate is exposed imagewise to a carbon arc for 5 minutes with an intensity of 2,000 foot-candles. The exposed plate is tray developed with agitation for 3 minutes in 1.7 percent aqueous sodium hydroxide solution. A high gloss, greenish blue image is obtained; however, with subsequent handling in room light, the yellow colored component that is present due to the light-sensitive polymer is bleached and an excellent cyan colored image of high-visual contrast is obtained.

EXAMPLE 8

Resist coatings are made as in Example 7 but without the polymeric dye and result in a yellow colored image. However, such an image is not readily visible under a yellow safelight such as is often used in the trade. Further, on exposure to room light for a brief period of time (an hour or so), the yellow image fades and the contrast is greatly reduced thus making it difficult to recognize the resist image.

EXAMPLE 9

A polymer dye (0.56 g) prepared by the melt copolymerization of diphenyldianilinosilane with 1,4-bis(2-hydroxyethylamino)anthraquinone (Example 3) is added to 100 cc of a resist formulation prepared from poly(vinyl cinnamate) as described in column 4 of Minsk et al. U.S. Pat. No. 2,690,966. The formulation is coated on copper plates that have previously been claimed with pumice and immersion in 5 percent hydrochloric acid for 30 seconds at room temperature. The plates are dried for 30 minutes at room temperature plus an additional 30 minutes at 50° C. The coatings are exposed imagewise for 10 minutes with an intensity of 2,000 foot-candles. The plates are developed for 2 minutes in a mixture of xylene and methyl cellosolve acetate. A dark, brown image is obtained.

EXAMPLE 10

A positive-working formulation is prepared as follows:

4.0 g of the copolymer of p-aminostyrene-styrene sulfonamide of naphthoquinone-(1,2)-diazode-(2)-5-sulfochloride used in Example 7
28.0 g of cresol formaldehyde resin
0.80 g of the polymer dye of Example 3
88.0 cc of methyl cellosolve acetate
12.0 cc of 4-butyrolactone.

The formulation is coated on a polyester transparent substrate, exposed imagewise, and developed in aqueous 1.5 percent sodium hydroxide solution. A cyan colored image on a transparent substrate is obtained.

EXAMPLE 11

A positive-working resist formulation containing the polymeric dye of Example 4 is prepared as follows:

40.0 g of the positive-working polymeric naphthoquinonediazide used in Example 7
230 g cresol formaldehyde resin ("Alnovol 429K" sold by American Hoechst Corporation)
110 g Phenolic resin "5254" (a 100 percent Phenolic non-heat hardening oil soluble resin sold by Union Carbide Co.)
4.0 g chlorinated biphenyl ("Arochlor 5460" sold by Monsanto Chemical Co.)
2.0 g Malonic acid
8.0 g the polymer of Example 4
930 cc Methyl cellosolve acetate
70 cc 4-Butyrolactone.

A coating is prepared with the above-formulation as in Example 6 and exposed for 4 minutes to a carbon arc with an intensity of 2,000 foot-candles. The plate is treated with 1.2 percent aqueous sodium hydroxide with slight swabbing. A good glossy image is obtained which is greenish in color, but with subsequent non-image exposure a good cyan image is obtained.

EXAMPLE 12

A positive-working resist formulation containing a polymeric dye of Example 5 is prepared with the following materials:

4.0 g of the positive-working polymeric naphthoquinonediazide used in Example 7
23.0 g Phenolic resin ("Alnovol 429K", a cresol-formaldehyde resin sold by American Hoechst Corporation)
11.0 g Phenolic resin "5254" (a 100 percent phenolic non-heat hardening oil soluble resin sold by Union Carbide Co.)
0.2 g Phenoxy resin "PHD" (a high molecular weight copolymer of epichlorohydrin and bisphenol A sold by Union Carbide Co.)

0.4 g chlorinated biphenyl ("Arochlor 5460," sold by Monsanto Chemical Co.)
0.2 g Malonic acid
0.8 g the polymer of Example 5
93.0 cc Methyl cellosolve acetate
7.0 cc 4-Butyrolactone.

A coating is prepared as in Example 7 and exposed for 4 minutes to a carbon arc with an intensity of 2,000 foot-candles. The plate is treated with 1.2 percent aqueous sodium hydroxide. A good glossy image is obtained which is greenish in color, but with subsequent uniform exposure a good cyan image is obtained.

EXAMPLE 13

A positive-working resist formulation containing a polymeric dye of Example 6 is prepared with the following materials:

4.0 g of a positive-working polymeric naphthoquinone diazide used in Example 7,
23.0 g Phenolic resin (Alnovol 429K, a cresol-formaldehyde resin sold by American Hoechst Corporation)
11.0 g Phenolic resin (5254, a 100 percent phenolic non-heat hardening oil soluble resin sold by Union Carbide Co.)
0.4 g chlorinated biphenyl (Arochlor 5460, sold by Monsanto Chem. Co.)
0.2 g Malonic acid
0.8 g polymer of Example 6
93.0 cc Methyl cellosolve acetate
7.0 cc 4-Butyrolactone.

A coating is prepared as in Example 7 and exposed for 4 minutes to a carbon arc with an intensity of 2,000 foot-candles. The plate is treated with 1.1 percent aqueous sodium hydroxide. A good glossy image is obtained which is greenish in color. With subsequent uniform exposure a good cyan image is obtained.

The invention has been described in detail with particular reference to preferred embodiments thereof, but it will be understood that variations and modifications can be effected within the spirit and scope of the invention.

What is claimed is:

1. A dye copolymer of substantially equimolar amounts of a diorganodifunctionalsilane and an anthraquinone derivative having two aliphatic hydroxy groups, said copolymer comprising repeating units having the formula:

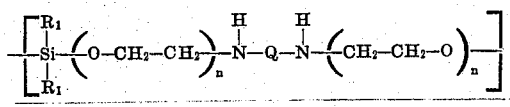

wherein $n$ is an integer of 1 to 4; $R_1$ is a member selected from the group consisting of a lower alkyl, a lower cycloalkyl, a lower alkenyl and a lower aryl; and Q is a divalent anthraquinonylene radical selected from the group consisting of:

(a) 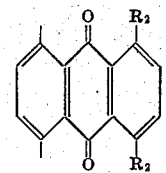

(b) 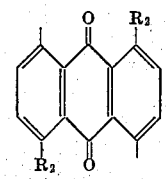

(c) 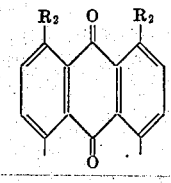

wherein $R_2$ is selected from the group consisting of hydrogen, hydroxy and halogen; the copolymer having a molecular weight of from 1,500 to 25,000.

2. A copolymer as defined in claim 1 wherein Q is a divalent radical having the formula:

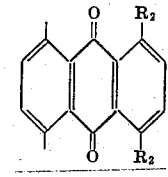

wherein $R_2$ is selected fro the group consisting of hydrogen and hydroxy.

3. A copolymer as defined in claim 1 wherein $R_1$ is selected from the group consisting of an alkyl of one to four carbon atoms and phenyl, and $R_2$ is hydrogen.

4. A copolymer as defined in claim 1 wherein $n$ is 1, $R_1$ is phenyl and $R_2$ is hydrogen.

5. A copolymer as defined in claim 1 wherein $n$ is 2, $R_1$ is phenyl, and $R_2$ is hydrogen.

6. A copolymer as defined in claim 2 wherein $n$ is 1, $R_1$ is phenyl and $R_2$ is hydrogen.

7. A copolymer as defined in claim 2 wherein $n$ is 2, $R_1$ is phenyl, and $R_2$ is hydrogen.

* * * * *